United States Patent [19]

Becnel

[11] Patent Number: 4,582,494
[45] Date of Patent: Apr. 15, 1986

[54] PROTECTED LIQUID-SENSITIVE ACTUATOR FOR DISPLACEMENT RESPONSIVE DEVICES

[76] Inventor: Steven A. Becnel, Rte. 1, Box 588B, Belle Chasse, La. 70037

[21] Appl. No.: 630,551

[22] Filed: Jul. 13, 1984

Related U.S. Application Data

[63] Continuation-in-part of Ser. No. 267,457, May 27, 1981, abandoned.

[51] Int. Cl.$^4$ .......................................... H01H 29/00
[52] U.S. Cl. ........................................ 441/95; 441/92; 441/97; 441/100
[58] Field of Search ...................... 441/92, 95, 80, 88, 441/94, 97, 100; 200/61.06, 61.07, 61.04

[56] References Cited

U.S. PATENT DOCUMENTS

| | | | |
|---|---|---|---|
| 2,369,215 | 2/1945 | Crise | 200/61.07 |
| 2,627,998 | 2/1953 | Musser | 441/95 |
| 3,127,624 | 4/1964 | Kubit | 441/95 |
| 3,602,661 | 8/1971 | Liedberg | 200/61.05 |
| 3,808,385 | 4/1974 | Klinefelter | 200/61.04 |

Primary Examiner—Trygve M. Blix
Assistant Examiner—C. T. Bartz
Attorney, Agent, or Firm—Banner, Birch, McKie & Beckett

[57] ABSTRACT

A liquid-sensitive actuator for actuating a displacement responsive device, such as an inflator for a flotation device. The actuator comprises a sensing member within a housing which expands upon contact with a liquid entering the housing through an inlet. Expansion of the sensing member imparts displacement to the device and thereby causes its actuation. In the case of a flotation device, actuation may involve displacement of a trigger member to cause discharge of gas from a cartridge to deploy an inflatable cell. The sensing member may comprise a dried, compressed natural sponge member which expands rapidly and forcefully when immersed in water to actuate the device. A cover is provided for the housing which is movable between a latched, closed position substantially sealing the liquid inlet and an open position to permit entry of liquid into the housing. When the cover is in the closed position, the sensing member is physically immobilized to prevent premature activation of the actuator. The cover is maintained on the housing regardless of the position of the cover.

19 Claims, 2 Drawing Figures

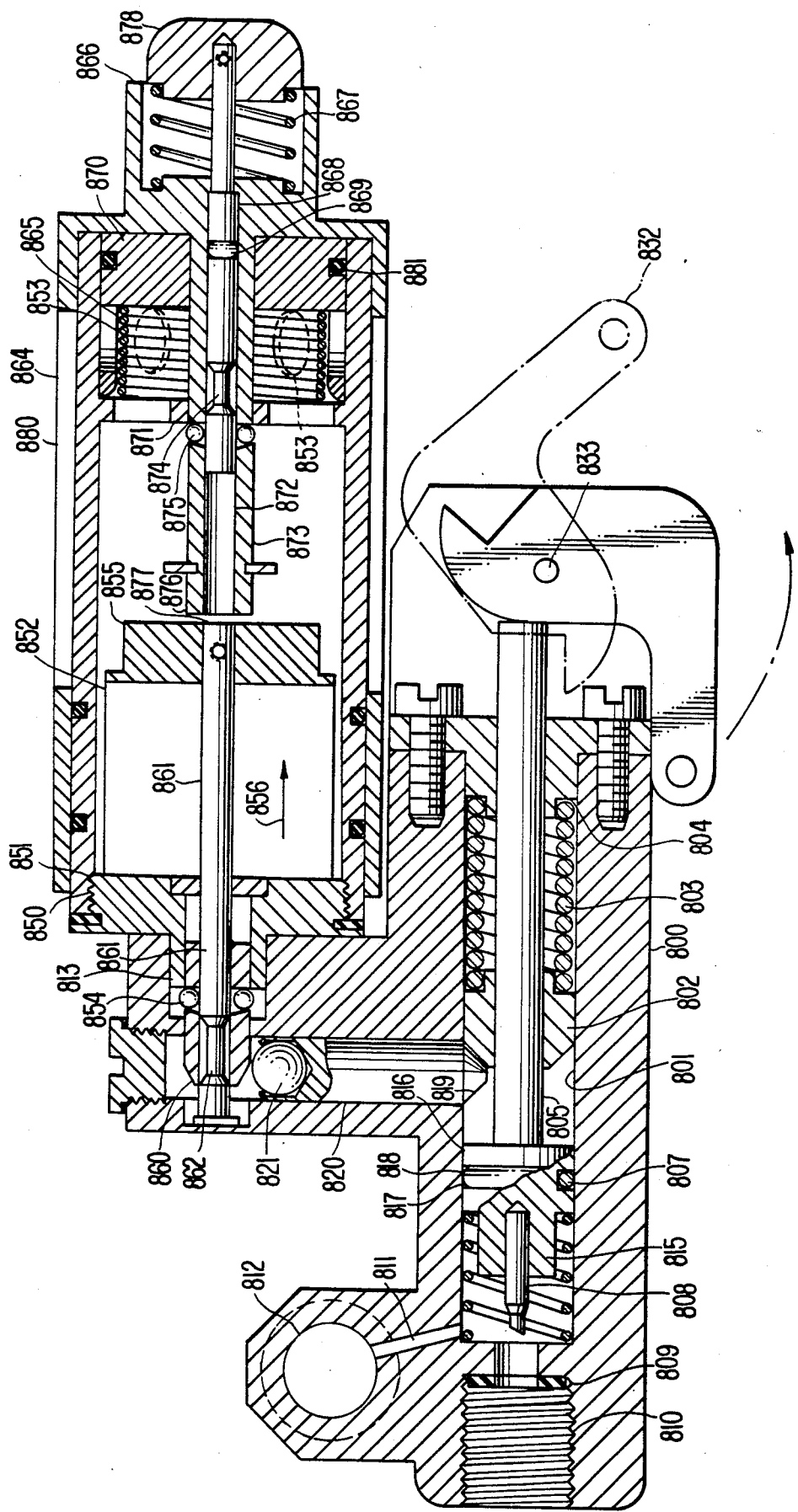

PROTECTED LIQUID-SENSITIVE ACTUATOR FOR DISPLACEMENT RESPONSIVE DEVICES

The present application is a continuation-in-part of application Ser. No. 267,457, filed May 27, 1981, now abandoned.

BACKGROUND OF THE INVENTION

1. Field of the Invention

The present invention relates to liquid-sensitive actuators for actuating devices upon immersion in a liquid and, more particularly, to a liquid-sensitive actuator for causing a physical displacement or movement to which a device to be actuated is responsive.

2. Description of the Prior Art

Various types of liquid-sensitive actuators are described in the prior art. These are used to produce a response to the presence of a liquid. Typically, the response may be the triggering of an alarm, the starting of a pump or the deployment of an inflatable flotation device, such as a life vest, raft, or the like.

In flotation device applications, at least one inflatable envelope or cell is coupled to and inflated by carbon dioxide gas which is released from a conventional $CO_2$ cartridge when the device is immersed in water. Typically, a piercing pin is driven forward into the sealing diaphragm at the end of the $CO_2$ cartidge to permit the escape of gas from the cartridge through a conduit or channel into the inflatable cell. In some, the piercing pin is spring-loaded and retained in a retracted position by a water soluble element. Contact with the water dissolves the element and permits the spring to drive the piercing pin forwardly into the cartridge diaphragm. In others, a battery-activated explosive squib or charge drives the piercing pin forwardly when detonated. Some of these employ a battery which is not activated until water enters its interior, causing a chemical reaction which generates sufficient voltage and current to detonate the explosive squib. Some batteries of this type operate only in salt water. Other detonator-type devices use an immersion switch to close a circuit through the salt water itself when the switch contacts are immersed. Still others use pressure-actuated switches which close the circuit when the switch is submerged to a predetermined depth. Other devices use an expandable element expandable on contact with the water to impart displacement to a trigger. The trigger detonates an explosive squib or charge or releases a spring-load mechanism which drives a sealing pin forward into the sealing diaphram of the $CO_2$ cartridge.

In substantially all of these flotation devices, a manual backup actuator is provided for inflating the device should the automatic features of the device fail. It has been found that most of the prior art devices have required unacceptably high reliance on the manual backup actuator because of frequent failure of the automatic system, or excessively slow reaction time to immersion. Unfortunately, failures or slow reactions of the automatic systems have resulted in numerous deaths and injuries of, for example, aviators or seamen who, due to trauma suffered during an accident or other unfortunate event, are unconscious at the time they enter the water and cannot manually actuate the flotation devices themselves. Many of the prior art devices also suffer from a high rate of premature actuation and deployment due to undesirably high sensitivity to ambient humidity. Premature actuation can often dangerously interfere with critical tasks being performed by personnel wearing these devices. An urgent need therefore exists for a liquid-sensitive actuator which will respond rapidly upon immersion in a liquid, especially for use in flotation devices designed to preserve life, yet will not prematurely actuate such devices by responding to damp atmospheric conditions, even over extended periods.

SUMMARY OF THE INVENTION

Accordingly, it is an object of the present invention to obviate the above-noted shortcomings and disadvantages of the prior art by providing a simple, compact, reliable and fast-acting liquid-sensitive actuator for devices which are intended to respond to liquid immersion.

Another object of the invention is to provide such an actuator which is sensitive to immersion in many different types of liquids, and does not rely on the electrical conductivity of the liquid for its actuation.

Another object of the invention is to provide such an actuator which will cause actuation only upon immersion in a liquid, so that premature and unwanted actuation is prevented.

Another object of the invention is to provide such an actuator which can easily and inexpensively be reconditioned for reuse.

Another object of the invention is to provide such an actuator which is fully compatible with existing hardware for flotation devices and the like.

Another object of the present invention is to provide such an actuator wherein the actuator cover can be moved to a closed position substantially sealing the liquid inlet to the actuator.

Another object of the invention is to provide such an actuator wherein the actuator cover may be releaseably latched into a closed position substantially sealing the liquid inlet to the actuator.

Another object of the invention is to provide such an actuator wherein the liquid sensing means does not respond to the presence of liquid when the actuator cover is closed.

Another object of the invention is to provide such an actuator wherein the liquid sensing means is immobilized when the cover is closed, thus preventing premature and unwanted actuation even if moisture somehow penetrates the closed cover.

These and other objects of the invention are accomplished by providing a liquid-sensitive actuator for actuating a displacement-responsive device upon immersion of the actuator in a liquid, the actuator comprising a housing, inlet means for admitting liquid into the housing when the housing is immersed in the liquid, and sensing means within the housing adapted to be operatively coupled to a displacement-responsive device. The sensing means is expandable upon contact with the liquid to impart displacement to and actuate the displacement-responsive device.

The liquid-sensitive actuator in accordance with the present invention includes a housing having a plurality of inlets which permit liquid to enter the housing when the actuator is immersed in liquid. A liquid sensing member is provided within the housing in the form of a material expandable upon contact with the liquid. When liquid enters the housing, the expandable member rapidly absorbs the liquid and expands. Expansion of the member imparts displacement to an attached follower plate and rod assembly which activates the displacement responsive device. A cover is provided over the housing which is movable between a latched closed position substantially sealing the liquid inlets and an open position which permits entry of liquid into the housing. When the cover is in a closed position, the expandable member is physically immobilized and prevented from expanding or otherwise imparting displacement to the attached follower plate and rod assembly. Thus, premature actuation of the displacement responsive device when the cover is closed is virtually eliminated.

BRIEF DESCRIPTION OF THE DRAWINGS

The novel features of the invention are set out with particularity in the appended claims, but the invention will be understood more fully and clearly from the following detailed description of the invention as set forth in the accompanying drawings, in which:

FIG. 2 is a longitudinal sectional view of another embodiment of an inflator coupled to a flotation device in accordance with the present invention.

DETAILED DESCRIPTION OF THE PREFERRRED EMBODIMENTS

Figure 1:
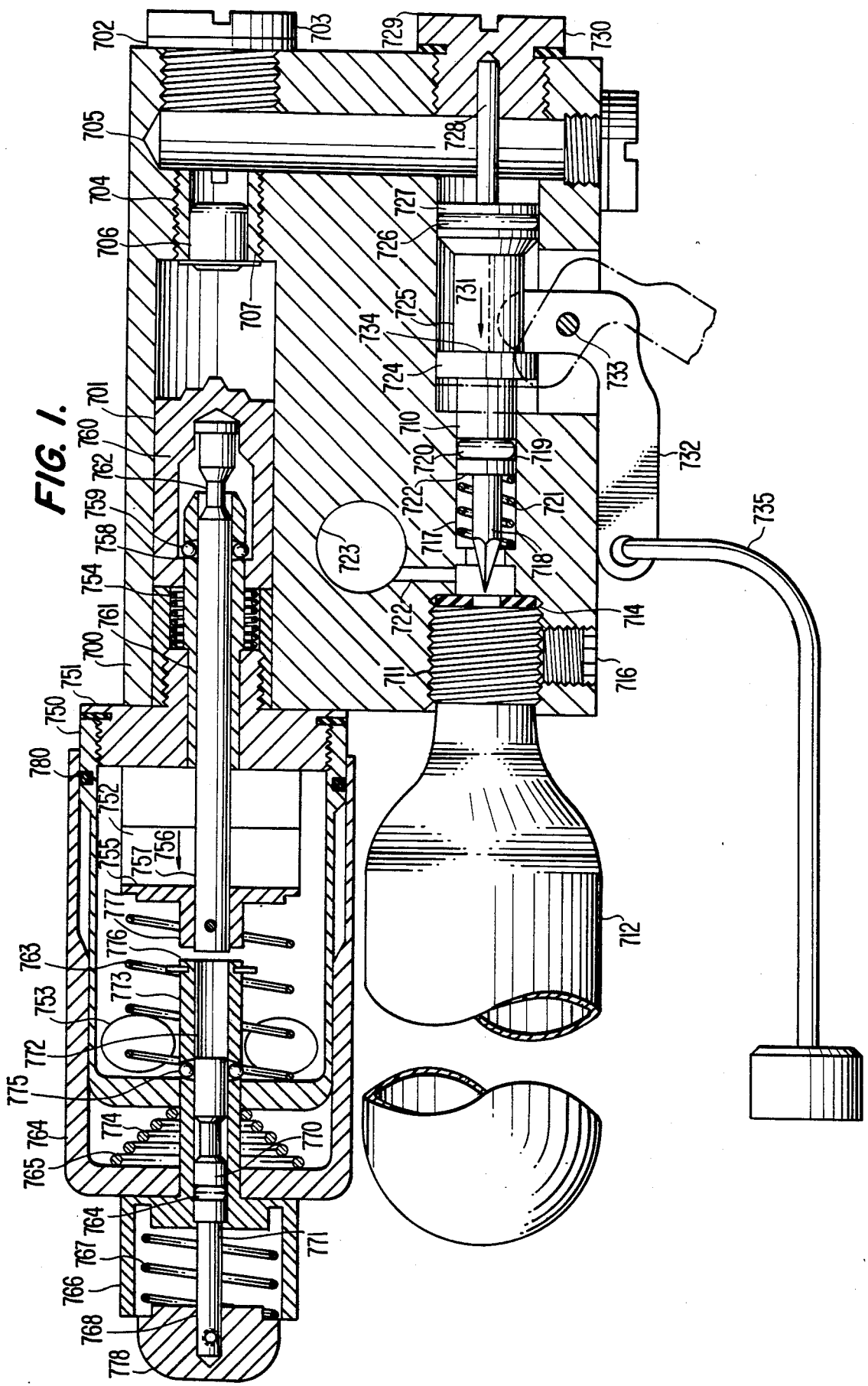
FIG. 1 is a longitudinal sectional view of an inflator coupled to a flotation device in accordance with the present invention.

In the description that follows, the liquid-sensitive actuator according to the invention is described as being used in connection with a life vest type of flotation device inflatable by gas from a $CO_2$ cartridge. It is to be understood, however, that the actuator is capable of being used to deploy other types of flotation devices such as rafts or buoys, to cause inflation of other devices, to actuate electrical circuitry and/or mechanical mechanisms, and in general to produce any type of desired response upon immersion of the actuator in a liquid.

FIG. 1 illustrates one embodiment of an actuator and inflator assembly in accordance with the present invention. The inflator comprises body 700 which may be machined from aluminum or other suitable durable material such as high impact plastic. An upper bore 701 is formed in body 700. The right-hand end portion 704 of bore 701 opens into transverse chamber 705 which may be filled with environmental air. Portion 704 threadedly receives a percussion cap assembly—which includes a percussion cap 706 and a threaded sleeve 707—which seals portion 704 from the remainder of bore 701. The percussion cap assembly is mounted in portion 704 through chamber 705 by removing port plug 703 and sealing gasket 702.

A lower bore 710 is formed in body 700. The left-hand end portion of bore 710 has an enlarged threaded portion 711 adapted to receive pressurized gas cylinder 712, such as a $CO_2$ cartridge. An annular sealing gasket 714 is disposed between cartridge 712 and a shoulder in bore 710. Cartridge 712 has a puncturable sealing diaphram (not shown) through which gas is discharged when punctured. Cartridge 712 is retained in position by set screw 716 which is threadedly received in body 700. Cartridge piercing assembly 717 comprising piercing pin 718 is slidable within bore 710. Pin 718 has an annular groove 719 in which O-ring 720 rests to prevent the escape of gas through the right-hand end of bore 710. Pin 718 also has a return spring 721 which engages a shoulder 722 on pin 718 to forceably eject pin 718 from the sealing diaphram, once it is punctured, and permits gas to escape from cartridge 712. Gas emerging from cartridge 712 is delivered to the inflatable cell through internal bore 722 which communicates with transverse port 723. Port 723 is adapted to mate with a threaded nipple which is secured to the inflatable cell so as to communicate with the interior of the cell.

Piercing assembly 717 is attached to piston assembly 724 which is slidably received in the right-hand end portion of bore 710. Piston assembly 724 comprises piston 725, O-ring 726, drive plate 727 and follower rod 728. O-ring 726 seals the piston assembly in sliding engagement with bore 710. The right hand end of bore 710 is closed by a threaded port plug 729 and gasket 730. When percussion cap 706 is detonated, as discussed below, high pressure combustion gases trapped in chamber 705 are forced against drive plate 727, which causes piston 725 to move in the direction of arrow 731. Thus, piercing pin 718 pierces the diaphram of cartridge 712. When the force exerted against plate 727 sufficiently dissipates, spring 721 ejects pin 718 from the diaphram to permit gas to excape from cartridge 712 through internal bore 722 and port 723 to the inflatable cell.

A mechanism is provided for manual puncturing of sealing diaphram 715 in the unlikely event that automatic actuation does not occur as explained below, or for the purpose of inflating the inflatable cell prior to entering the water. The device comprises an L-shaped lever 732 which is pivoted about pin 733 retained in body 700. The inner end of lever 732 bears against shoulder 734 of piston 725 when lever 732 is rotated by pull cord 735. Piston 725 thus drives piercing pin 718 into diaphram 715 as described above. The piercing assembly is permitted to return to its initial (retracted) position under the action of return spring 721 when lever 732 reaches its fully rotated position and its inner end clears shoulder 734. A safety wire may also be attached to lever 732 to retain it in a non-actuation position. The safety wire is designed to break when cord 735 is pulled firmly.

Port plugs 703 and 729 may be removed to provide pressure for operating additional devices when percussion cap 706 is detonated. Rod 728 may also be used for mechanically actuating additional devices.

The liquid-sensitive actuator which automatically detonates percussion cap 706 will now be described. The actuator comprises a housing 750 which is machined from aluminum, high impact plastic or other suitable material and is secured to body 700 by mounting stud 751 threadedly received in housing 750 and the left-hand end of upper bore 701. The right-hand end of bore 701 also includes a spring 754 and slide member or hammer 760. Spring 754 is held in compressed position by slide member 760 which has internal shoulder 758 bearing against balls 759. As shown in FIG. 1, balls 759 are held in position in tapered holes in rod 761, thus preventing rightward movement of slide member 760.

Within housing 750 is a liquid sensing means in the form of expandable member 752, such as a stack of dried, compressed natural sponges. Inlets 753 are provided in housing 750 through which liquid can enter housing 750. When immersed in liquid, expandable member 752 rapidly absorbs the liquid and expands in the direction of arrow 756. As expandable member 752 expands, follower plate 755 and attached rod 761 also move in the direction of arrow 756 against the light force of compression spring 763. The portion of rod 761 extending into upper bore 701 includes portion 762 which has a narrower diameter. As rod 761 withdraws from upper bore 701 due to the expansion of element 752, a point is reached when balls 759 drop into portion 762 of rod 761, thus releasing slide member 760 and allowing it to be projected rightward by the operation of springs 754. Slide member 760 thus impacts and detonates percussion cap 706 to trigger inflation of the inflatable cell as described above.

Housing 750 also includes cover 764 which is movable between a closed and latched position substantially sealing inlets 753 and an open position to permit entry of liquid into housing 750. When cover 764 is in a closed position, expandable member 752 is physically immobilized and prevented from expanding or otherwise imparting displacement to follower plate 755 and rod 761. Thus, premature activation of the displacement responsive device when cover 764 is closed is virtually precluded.

Cover 764 includes a compression spring compressor 765 and push button release assembly 766. Push button assembly 766 includes button 778, return spring 767 and rod assembly 768. Rod assembly 768 is comprised of inner portion 770 and outer portion 771 separated by O-ring 769. O-ring 769 prevents moisture from entering the housing around rod assembly 768 when cover 764 is closed.

Rod assembly 768 is slidably received in bore 772. Bore 772 is formed in elongated projection 773, which moves along with cover 764. Inner portion 770 of rod assembly 768 has a small diameter portion 774. Cover 764 is held in a closed position—with O-ring 780 completely sealing out moisture—by balls 775 which are held in tapered holes in projection 773 by rod assembly 768 and bear against the inside end of housing 750. In the closed position, end 776 of elongated projection 773 is positioned immediately adjacent end 777 of rod 757. Thus, rod 757 is immobilized when cover 764 is in a closed position, therefore, removing the likelihood that the inflator assembly will be inadvertently triggered by shock, vibration or any residual moisture which may reside within housing 750. Thus, the actuator is completely disarmed. Cover 764 may be opened and the actuator armed by pressing push button 778 biased by spring 767. When button 778 is pushed, rod assembly 768 travels forward momentarily so that balls 775 can drop into portion 774 and thus allowing projection 773 and cover 764 to move left to the open position.

A further embodiment of an actuator and inflator assembly according to the invention is shown in FIG. 2. The inflator assembly comprises body 800 which may likewise be machined from aluminum or other suitable durable material such as high impact plastic.

A lower bore 801 is formed in body 800. The left-hand end of bore 801 has an enlarged threaded poriton 810 adapted to receive a pressurized gas cartridge (not shown) such as cylinder 712 shown in FIG. 1. A sealing gasket 809 is disposed between the cartridge and a shoulder in bore 801. The cartridge has a puncturable sealing diaphram through which gas is discharged when punctured. Cartridge piercing assembly 815 comprising piercing pin 808, piston 815 and rod 805 is slidable within bore 801. Piston 815 has an annular groove 817 in which O-ring 818 is retained. O-ring 818 prevents the escape of gas through the right-hand end of bore 801. Piston 815 is biased by return spring 807 which forcibly ejects pin 808 fromn the cartridge sealing diaphram, once it is punctured, and permits gas to escape from the cartridge. Gas emerging from the cartridge is delivered to the inflatable cell through internal bore 811 which communicates with transverse port 812. Port 812 is adapted to receive and be sealingly secured to a hollow threaded nipple which is secured to the inflatable cell so as to communicate with the interior of the cell. Piercing assembly 815 is attached to drive rod 805.

Hammer 802 is slidably mounted in bore 801. Hammer 802 is held in a spring-loaded retracted position by pin 819 and spring 803. Pin 819 is slidably received in transverse bore 820 and projects into bore 801 to retain hammer 802.

The liquid-sensitive actuator which automatically raises pin 819 to release hammer 802 includes many of the same elements as described above with respect to the embodiment of the invention shown in FIG. 1. The actuator comprises a housing 850 which is secured to body 800 by a mounting member 851 threadedly received in the housing.

Within housing 850 is liquid sensing means in the form of expandable member 852, such as a dried, compressed natural sponge. Apertures 853 are provided in housing 850 through which liquid can enter housing 850. When immersed in liquid, expandable member 852 rapidly absorbs the liquid and expands in the direction of arrow 856. As expandable member 852 expands, follower plate 855 and attached rod 861 also move in the direction of arrow 856. The portion of rod 861 extending into upper bore 813 and sleeve 860 includes portion 862 which has a narrower diameter. As rod 861 withdraws from upper bore 801, a point is reached when balls 859—which are ordinarily retained in tapered holes in sleeve 860 and bear against the left end shoulder of mounting member 851—drop into portion 862 of rod 861, thus releasing sleeve member 860 and allowing it to move to the right by the force of spring 803 acting through the beveled ends of hammer 802, pin 819, sleeve 860 and ball 821. As pin 819 moves upward within bore 820, hammer 802 is released, forcing piercing pin 808 into the cartridge sealing diaphram.

Housing 850 also includes a cover 864 (slotted at 880) which in its closed position prevents undesired actuation of the inflator assembly. The cover assembly includes a compression spring 865, a plug 870 and O-ring seal 881, and push button release assembly 866. Push button assembly 866 includes button 878, spring 867 and a release rod assembly 868. Rod assembly 868 is slidably received in bore 872 in elongated projection 873 and includes an O-ring 869 which prevents moisture from inadvertently entering the housing when cover 864 is closed. When push button 878 is depressed, rod 868 moves to the left. A reduced diameter portion 874 of rod 868 receives balls 875—which normally are retained in tapered holes in rod 868 and bear against a shoulder 871 secured to the housing—thus releasing the cover 864 and allowing it and plug 870 to move to the right under the action of spring 865 to uncover ports 853. In the closed position, end 876 of elongated projection 873 is positioned immediately adjacent end 877 of rod 861. Thus, rod 861 is immobilized when cover 864 is in a closed position, therefore eliminating the possibility that the inflator assembly will be inadvertently triggered by shock, vibration or any moisture within housing 850. Thus, the actuator is completely disarmed.

A mechanism is provided for manual puncturing of the cartridge sealing diaphram in the unlikely event that automatic actuation does not occur as explained above or for the purpose of inflating the inflatable cell prior to entering the water. The device comprises an L-shaped lever 832 which is pivoted about pin 833 retained in body 800. The inner, arcuate end of lever 832 is adapted to bear against the end of rod 805 when lever 832 is rotated by a pull cord (not shown), and drive rod 805 and piercing pin 818 into the diaphram as described above. The notch at the inner end of lever 832 allows rod 805 to move back and retract pin 818 from the diaphragm. A safety wire may also be attached to lever 832 to retain it in a non-actuation position. The safety wire is designed to break when the pull cord is pulled firmly.

Other variations and modifications will be apparent to those skilled in the art without departing from the true spirit and scope of the invention, which is to be limited only by the appended claims.

I claim:

1. In a liquid-sensitive actuator for activating a displacement responsive device upon immersion of said actuator in a liquid, said actuator including a housing with a liquid inlet and a moisture-sensitive sensing means in said housing, and activating means operatively coupled to said actuator for activating said displacement-responsive device when said moisture-sensitive sensing means senses the presence of liquid in said housing, the improvement comprising:
   a movable cover having a shutter portion adapted to close said inlet and substantially prevent the entry of moisture into said housing; and
   coupling means for coupling said cover to said housing and permitting movement of said shutter portion relative to said housing between a closed position substantially sealing said inlet and an open position to permit entry of liquid into said housing, said coupling means maintaining said cover in coupled relationship with said housing throughout the range of movement of said shutter portion.

2. The liquid-sensitive actuator of claim 1 wherein said liquid inlet is located along a side of said housing.

3. The liquid-sensitive actuator of claim 1 wherein said cover is movable longitudinally telescopingly over said housing.

4. The liquid-sensitive actuator of claim 1 wherein said cover includes latch means for maintaining said cover in said closed position.

5. The liquid-sensitive actuator of claim 4 wherein said latch means includes a spring-biased push-button release device for releasing said cover from a closed position.

6. The liquid-sensitive actuator of claim 1 wherein said activating means comprises movable follower means for activating said displacement responsive device, said moisture-sensitive sensing means effecting the movement of said follower means.

7. In a liquid-sensitive actuator for activating a displacement responsive device upon immersion of said actuator in a liquid, said actuator including a housing with a liquid inlet and a moisture-sensitive sensing means in said housing, and activating means operatively coupled to said actuator for activating said displacement-responsive device when said moisture-sensitive sensing means senses the presence of liquid in said housing, the improvement comprising:
   a movable cover having a shutter portion adapted to close said inlet and substantially prevent the entry of moisture into said housing;
   coupling means for coupling said cover to said housing and permitting movement of said shutter portion relative to said housing between a closed position substantially sealing said inlet and an open position to permit entry of liquid into said housing, said coupling means maintaining said cover in coupled relationship with said housing throughout the range of movement of said shutter portion; and
   movable follower means for said activating means for activating said displacement responsive device; said moisture-sensitive sensing means effecting the movement of said follower means, said activating means further including keeper means for preventing movement of said follower means when said cover is closed.

8. The liquid-sensitive actuator of claim 7 wherein said follower means comprises a longitudinally movable actuating rod, and said keeper means comprises an internal projection on the inside of said cover which terminates adjacent the end of said actuation rod when said cover is closed.

9. In a liquid-activated device for discharging fluid from a container, the device having a liquid-sensitive actuator including a housing with a liquid inlet and a moisture-sensitive sensing means in said housing, and discharge means operatively coupled to said actuator for venting fluid from said container when activated by the presence of liquid in said housing, the improvement comprising:
   a cover having a movable shutter portion adapted to close said inlet and substantially prevent the entry of moisture into said housing; and
   coupling means for coupling said cover to said housing and permitting movement of said shutter portion relative to said housing between a closed position substantially sealing said inlet and an open position to permit entry of liquid into said housing, said coupling means maintaining said cover in coupled relationship with said housing throughout the range of movement of said shutter portion.

10. The liquid-activated device of claim 9 wherein said liquid inlet is located along a side of said housing.

11. The liquid-activated device of claim 9 wherein said cover is movable longitudinally telescopingly over said housing.

12. The liquid-activated device of claim 9 wherein said cover includes latch means for maintaining said cover in said closed position.

13. The liquid-activated device of claim 12 wherein said latch means includes a spring-biased push-button release device for releasing said cover from a closed position.

14. The liquid-activated device of claim 9 wherein said discharge means comprises movable follower means for activating said displacement responsive device, said moisture-sensitive sensing means effecting the movement of said follower means.

15. In a liquid-activated device for discharging fluid from a container, the device having a liquid-sensitive actuator including a housing with a liquid inlet and a moisture-sensitive sensing means in said housing, and discharge means operatively coupled to said actuator for venting fluid from said container when activated by the presence of liquid in said housing, the improvement comprising:
   a cover having a movable shutter portion adapted to close said inlet and substantially prevent the entry of moisture into said housing;
   coupling means for coupling said cover to said housing and permitting movement of said shutter portion relative to said housing between a closed position substantially sealing said inlet and an open position to permit entry of liquid into said housing, said coupling means maintaining said cover in coupled relationship with said housing throughout the range of movement of said shutter portion; and movable follower means for said discharge means for activating said displacement responsive device, said moisture-sensitive sensing means effecting the movement of said follower means, said discharge means further including keeper means for preventing movement of said follower means when said cover is closed.

16. The liquid-activated device of claim 15 wherein said follower means comprises a longitudinally movable actuating rod, and said keeper means comprises an internal projection on the inside of said cover which terminates adjacent the end of said actuation rod when said cover is closed.

17. In a liquid-sensitive actuator for activating a displacement responsive device upon inversion of said actuator in a liquid, the actuator including a housing with a liquid inlet, moisture-sensitive sensing means in said housing, follower means movable in response to the sensing of liquid in the housing by said sensing means, and a movable cover adapted to close said inlet and substantially prevent the entry of moisture into the housing, the improvement comprising keeper means associated with said cover for preventing movement of said follower means when said cover is in its closed position.

18. A liquid-sensitive actuator according to claim 17 wherein said sensing means is an expandable element.

19. A liquid-sensitive actuator according to claim 18 wherein said follower means comprises a longitudinally movable actuating rod, said cover is longitudinally movable, and said keeper means comprises an internal longitudinal projection on said cover which terminates adjacent the end of said actuating rod when the cover is closed.

* * * * *